US012203680B2

(12) United States Patent
Kozubal et al.

(10) Patent No.: US 12,203,680 B2
(45) Date of Patent: *Jan. 21, 2025

(54) SYSTEMS WITH MULTI-CIRCUITED, PHASE-CHANGE COMPOSITE HEAT EXCHANGERS

(71) Applicant: Alliance for Sustainable Energy, LLC, Golden, CO (US)

(72) Inventors: Eric Kozubal, Superior, CO (US); Jason David Woods, Boulder, CO (US); Eric Jason Bonnema, Littleton, CO (US); Ramin Teimouri Faramarzi, Pacific Palisades, CA (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/165,401

(22) Filed: Feb. 7, 2023

(65) Prior Publication Data

US 2023/0272927 A1  Aug. 31, 2023

Related U.S. Application Data

(63) Continuation of application No. 16/842,076, filed on Apr. 7, 2020, now Pat. No. 11,598,536, which is a continuation of application No. 15/991,275, filed on May 29, 2018, now Pat. No. 10,648,743.

(60) Provisional application No. 62/511,586, filed on May 26, 2017.

(51) Int. Cl.
*F24F 5/00*    (2006.01)

(52) U.S. Cl.
CPC ............ *F24F 5/0021* (2013.01); *F24F 5/001* (2013.01)

(58) Field of Classification Search
CPC ...... F25B 25/005; F25B 39/02; F28D 20/021; F28D 20/023; F28F 1/022; F24F 5/0021; F24F 5/001
See application file for complete search history.

(56) References Cited

U.S. PATENT DOCUMENTS

| | | | |
|---|---|---|---|
| 4,572,864 A | 2/1986 | Benson et al. | |
| 5,501,268 A | 3/1996 | Stovall et al. | |
| 5,755,104 A | 5/1998 | Rafalovich et al. | |
| 5,811,062 A | 9/1998 | Wegeng et al. | |
| 6,059,016 A | 5/2000 | Rafalovich et al. | |
| 7,316,262 B1 | 1/2008 | Rini et al. | |

(Continued)

FOREIGN PATENT DOCUMENTS

| | | |
|---|---|---|
| CN | 02099651 A | 6/2011 |
| EP | 0 010 819 A1 | 5/1980 |

(Continued)

OTHER PUBLICATIONS

Examination Report No. 1 for Australian Patent Application No. 2018272093, dated Jan. 27, 2023, pp. 1-3.

(Continued)

*Primary Examiner* — Kun Kai Ma
(74) *Attorney, Agent, or Firm* — Alexandra M Hall (57) ABSTRACT

A system comprising a first plurality of microchannels, a second plurality of microchannels in thermal communication with the first plurality of microchannels such that the first plurality of microchannels and second plurality of microchannels form a heat exchanger, and a phase change composite in thermal communication with the heat exchanger and methods of operating are disclosed herein.

20 Claims, 10 Drawing Sheets

(56) References Cited

U.S. PATENT DOCUMENTS

| | | |
|---|---|---|
| 8,109,324 B2 | 2/2012 | Farid et al. |
| 8,747,805 B2 | 6/2014 | Tonkovich et al. |
| 10,648,743 B2 | 5/2020 | Kozubal et al. |
| 2008/0092875 A1 | 4/2008 | Leifer et al. |
| 2008/0099187 A1 | 5/2008 | Rini et al. |
| 2009/0184283 A1 | 7/2009 | Chung et al. |
| 2011/0056667 A1 | 3/2011 | Taras et al. |
| 2011/0127015 A1 | 6/2011 | Taras et al. |
| 2012/0043056 A1 | 2/2012 | Shimazu et al. |
| 2012/0291991 A1 | 11/2012 | Dekenberger |
| 2014/0260404 A1 | 9/2014 | Verma et al. |
| 2015/0192345 A1 | 7/2015 | McDonnell et al. |
| 2015/0197678 A1 | 7/2015 | Han et al. |
| 2016/0003552 A1 | 1/2016 | Chordia et al. |
| 2016/0068411 A1 | 3/2016 | Gurin |
| 2016/0245558 A1 | 8/2016 | Feng et al. |
| 2016/0363359 A1 | 12/2016 | Lin et al. |
| 2017/0038103 A1 | 2/2017 | Torrent |
| 2017/0210196 A1 | 7/2017 | Bidner et al. |
| 2017/0307263 A1 | 10/2017 | Ma et al. |
| 2018/0086201 A1* | 3/2018 | Antrobus ................ B60L 50/90 |
| 2018/0306469 A1 | 10/2018 | Gupte |
| 2019/0242657 A1 | 8/2019 | Ignatiev et al. |
| 2020/0232662 A1 | 7/2020 | Kozubal et al. |

FOREIGN PATENT DOCUMENTS

| | | | |
|---|---|---|---|
| EP | 3112776 A1 * | 1/2017 | ............. F25B 27/00 |
| JP | 53-011343 | 1/1978 | |
| JP | H02-197761 A | 8/1990 | |
| JP | 2015-110412 A | 6/2015 | |
| WO | 01/38810 A2 | 5/2001 | |
| WO | 2012/166650 A1 | 12/2012 | |
| WO | 2014/036476 A2 | 3/2014 | |
| WO | 2017/044089 A1 | 3/2017 | |

OTHER PUBLICATIONS

Al-Abidi et al., "Review of Thermal Energy Storage for Air Conditioning Systems", Renewable and Sustainable Energy Reviews, 2012, vol. 16, pp. 5802-5819.

Mosaffa et al., "Exergoeconomic and Environmental Analyses of an Air Conditioning System Using Thermal Energy Storage", Applied Energy, 2016, vol. 162, pp. 515-526.

Yamaha et al., "The Evaluation of Peak Shaving by a Thermal Storage System Using Phase-Change Materials in Air Distribution Systems", HVAC&R Research, Sep. 2006, vol. 12, No. S3, pp. 861-869.

Extended European Search Report, Application No. 18805410.0, dated Dec. 3, 2020, pp. 1-7.

International Preliminary Report on Patentability for International (PCT) Application PCT/US18/34869, Date of Completion of Report: Aug. 13, 2019, pp. 1-7.

International Search Report and Written Opinion for International (PCT) Application PCT/US18/34869, Date of Mailing: Aug. 23, 2018, pp. 1-7.

* cited by examiner

SYSTEMS WITH MULTI-CIRCUITED, PHASE-CHANGE COMPOSITE HEAT EXCHANGERS

CROSS-REFERENCE TO RELATED APPLICATIONS

This application is a continuation of U.S. patent application Ser. No. 16/842,076, which is a continuation of U.S. patent application Ser. No. 15/991,275 which claims the benefit of U.S. Provisional Application No. 62/511,586 filed May 26, 2017, the contents of which are incorporated herein by reference in their entirety.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

According to the U.S. Environmental Protection Agency, in 2005, buildings accounted for approximately 38.9% of total U.S. energy consumption. Heating, ventilation, and air conditioning (HVAC) systems are responsible for approximately 55% of the total energy consumption in buildings. Most commercial buildings use HVAC units that run continuously during building occupancy to provide cooling. Such continuous operation results in high consumption costs and low energy efficiency. Peak energy usage for HVAC units also typically occurs during peak electricity demand times, further increasing costs.

Storage of thermal energy for cooling purposes offers the potential to manage increasing demand for high-peak power consumption while also minimizing power expenses. Hybrid systems that combine traditional air conditioning units with thermal energy storage systems may provide solutions for reducing energy usage and shifting electricity demand from on-peak to off-peak hours. Traditional thermal energy storage systems for building cooling, such as ice, due to its low thermal conductivity, are limited by low efficiency and slow response time, making them unattractive to building users.

The foregoing examples of the related art and limitations related therewith are intended to be illustrative and not exclusive. Other limitations of the related art will become apparent to those of skill in the art upon reading the specification and studying of the drawings in the present disclosure.

SUMMARY

In one aspect, the present disclosure describes a system comprising a first plurality of microchannels, a second plurality of microchannels in thermal communication with the first plurality of microchannels such that the first plurality of microchannels and second plurality of microchannels form a heat exchanger, and a phase change composite in thermal communication with the heat exchanger. In some embodiments, the first plurality of microchannels is connected to a first circuit comprising a first fluid, the second plurality of microchannels is connected to a second circuit comprising as second fluid and a compressor, and the first circuit is configured to be in thermal contact with an indoor airflow. In some embodiments, the phase change composite comprises a phase change material enclosed in a matrix. In some embodiments, the second fluid is a refrigerant. In some embodiments, the first circuit also comprises a first coil and a fan.

In one aspect, the present disclosure describes a method comprising directing a first plurality of microchannels through a phase change composite, directing a second plurality of microchannels through a phase change composite, thermally coupling the first plurality of microchannels and the second plurality of microchannels, exchanging heat between the first plurality of microchannels, the second plurality of microchannels, and the phase change composite, storing thermal energy in the phase change composite which may be discharged and charged throughout the day, wherein discharging the phase change composite occurs by removing heat from the phase change composite and depositing it in either of the first plurality of microchannels or the second plurality of microchannels, and charging the phase change composite occurs by depositing heat in phase change composite from either of the first plurality of microchannels the second plurality of microchannels. In some embodiments, the charging the phase composite and the discharging the phase change composite is controlled by the control cycle comprising monitoring the current state of charge of the phase change composite, establishing a target state of charge to be reached by the conclusion of a time period, comparing the current state of charge to the target state of charge, and turning on and off a compressor connected to the second plurality of microchannels to activate the second plurality of microchannels as needed to achieve the target state of charge. In some embodiments, when the phase change composite is charged it solidifies. In some embodiments, when the phase composite is discharged it liquifies. In some embodiments, the compressor is turned on for a maximum of ten (10) minutes in any one operation of the control cycle.

In one aspect, the present disclosure describes a method comprising thermally connecting a first plurality of microchannels and a second plurality of microchannels to form a heat exchanger, thermally connecting the heat exchanger and a phase change composite, operating a first circuit connected to the first plurality of microchannels, operating a second circuit connected to the second plurality of microchannels, wherein the first circuit comprises a first fluid, the first fluid removes heat from a first airflow, the first fluid deposits heat in the phase change composite, the second circuit comprises a second fluid, the second fluid operates a flow rate, and the second fluid removes heat from the phase change composite. In some embodiments, the second circuit also comprises a compressor configured to control the flow rate of the second fluid. In some embodiments, the first circuit and the second circuit may be operated concurrently or independently of each other.

In one aspect, the present disclosure describes a method comprising extending a first plurality of microchannels comprising a first fluid through a phase change composite, extending a second plurality of microchannels comprising a second fluid through a phase change composite, thermally coupling the first plurality of microchannels and second plurality of microchannels within the phase change composite, removing heat from a first airflow using the first fluid, depositing heat to the thermal energy storage media from the first fluid, and removing heat from the first fluid and thermal energy storage media using the second fluid, wherein the first fluid is routed through a coil to be in thermal contact with the first airflow, the second fluid is routed through a compressor and in thermal contact with a second airflow, and the compressor may be turned on and off to control the amount of heat exchanged with the phase change composite the thermal energy storage media by the second fluid. In some embodiments, the second fluid is a refrigerant. In some embodiments, the phase change composite comprises a phase change material embedded in a matrix.

BRIEF DESCRIPTION OF THE DRAWINGS

Exemplary embodiments are illustrated in referenced figures of the drawings. It is intended that the embodiments and figures disclosed herein are illustrative rather than limiting.

| REFERENCE NUMBERS | |
|---|---|
| 100 | multi-circuit cooling system |
| 105 | first airflow |
| 110 | first coil |
| 115 | first fan |
| 120 | first fluid |
| 125 | compressor |
| 130 | pump |
| 135 | heat exchanger |
| 140 | phase change composite |
| 145 | second fluid |
| 150 | second airflow |
| 155 | condenser |
| 160 | second fan |
| 165 | expansion valve |
| 201 | first plurality of microchannels |
| 202 | second plurality of microchannels |
| 301 | module |
| 401 | thermal energy storage unit |
| 700 | multi-circuit heating and cooling |
| 710 | second coil |
| 715 | check valve |
| 730 | reversing valve |
| 735 | three-way valve |
| 805 | fluid heat exchanger |
| 815 | diverting valve |
| 915 | on/off valve |
| 925 | heat pump |

DETAILED DESCRIPTION

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

Disclosed herein are multi-circuit thermal energy storage (TES) systems connected in heating, ventilation, and air conditioning (HVAC) systems. The two circuits (a refrigeration circuit and a secondary fluid circuit) are designed to work together, but they might contain separate units. In certain configurations, the TES system may use a phase change composite (PCC) with high thermal conductivity, which allows for efficient heat transfer within the PCC. Thus, the PCC itself may be used as the heat transfer media between a refrigerant and a secondary fluid, allowing the refrigerant/secondary fluid heat exchanger in typical configurations of HVAC systems to be removed. Operation may also be simplified, because the PCC may be charged using a fixed or variable speed compressor at a heat rate different than what is required to cool the process air stream and at a time coincident or not coincident with the need to cool the process air stream. To further simplify the system, mixing or diverting valves in the system to complicate control may be removed. The system may operate as a variable cooling load system by modulating a fluid pump and a process air fan in conjunction with one another. Alternatively, to save cost and be more energy efficient, a secondary fluid pump may be fixed speed while a process air fan can be variable speed.

The PCC may act as a buffer between a traditional mechanical refrigeration cycle and a secondary fluid. The vapor compression cycle may act as a traditional refrigeration cycle and the secondary fluid cycle may cool air in a building. The secondary fluid cycle may include a cooling coil which removes heat from the air in the building. The vapor compression cycle may include an evaporator to release heat outside of the system (i.e., outside of the building). The secondary fluid temperature exiting the PCC may be constant (within a few ° C.) regardless of the cooling load from the cooling coil. The vapor compression cycle's evaporator temperature (i.e., suction temperature) may respond to the PCC's state of charge. Thus, the compressor may be a fixed speed unit removing heat from the PCC at a constant rate regardless of the rate of heat removal from the secondary fluid. A single speed compressor may then be operated at its maximum efficiency rather than being tied to the cooling requirements of the building. The system can therefore provide significant energy savings similar to air conditioners with variable speed compressors. In some embodiments, the present disclosure integrates a PCC material with a vapor-compression air conditioner.

Exemplary secondary fluids may include water, brine, hydrocarbon (e.g. propylene or ethylene glycol), or a refrigerant (e.g. R410A, carbon dioxide—$CO_2$). Use of a refrigerant may allow for enhanced heat transfer in the cooling coil and TES, thus improving system efficiency. Exemplary refrigerants may include R410A, carbon dioxide, propane, ammonia, or other fluids with high heat conductivity.

A PCC may consist of a graphite matrix made from expanded graphite flakes and a phase-change material embedded into the pores of the graphite matrix. Exemplary phase-change materials may be organic alkanes, inorganic alkanes, or fatty acids. The large heat capacity may maintain battery temperature and prevent thermal runaway. A refrigeration system using the TES containing a PCC may first involve a liquid refrigerant entering half of the tubes in a PCC, where the liquid refrigerant may evaporate and cool the PCC, solidifying the PCC. Next, a compressor may increase the pressure of the refrigerant vapor exiting the PCC. The refrigerant may then condense in a condenser, rejecting the heat of condensation to the ambient air, which may be directed outside of the building. Finally, an expansion valve may lower the pressure of the refrigerant back to the evaporator pressure.

Operating a multi-circuit phase change composite cooling system may have many benefits over existing air conditioning systems. First, the first circuit and second circuit do not need to have balanced heat rates. The lift of each compressor may be managed through the selection of the proper phase transition temperature of the PCC. Second, no intercooling is required. Third, the first fluid that charges the PCC will cool the second fluid down to the PCC's phase change transition temperature, which is colder than if the first fluid was returning from a process air stream. This allows the first fluid to extract more heat from the first airflow at the same compressor lift.

In some embodiments, the first circuit and second circuit may operate independently, such that either circuit may be at a drastically different flow rate from the other. Likewise, one circuit may be inactive (or "shut down") while the other operates. The two circuits may in some instances operate concurrently.

Figure 1:
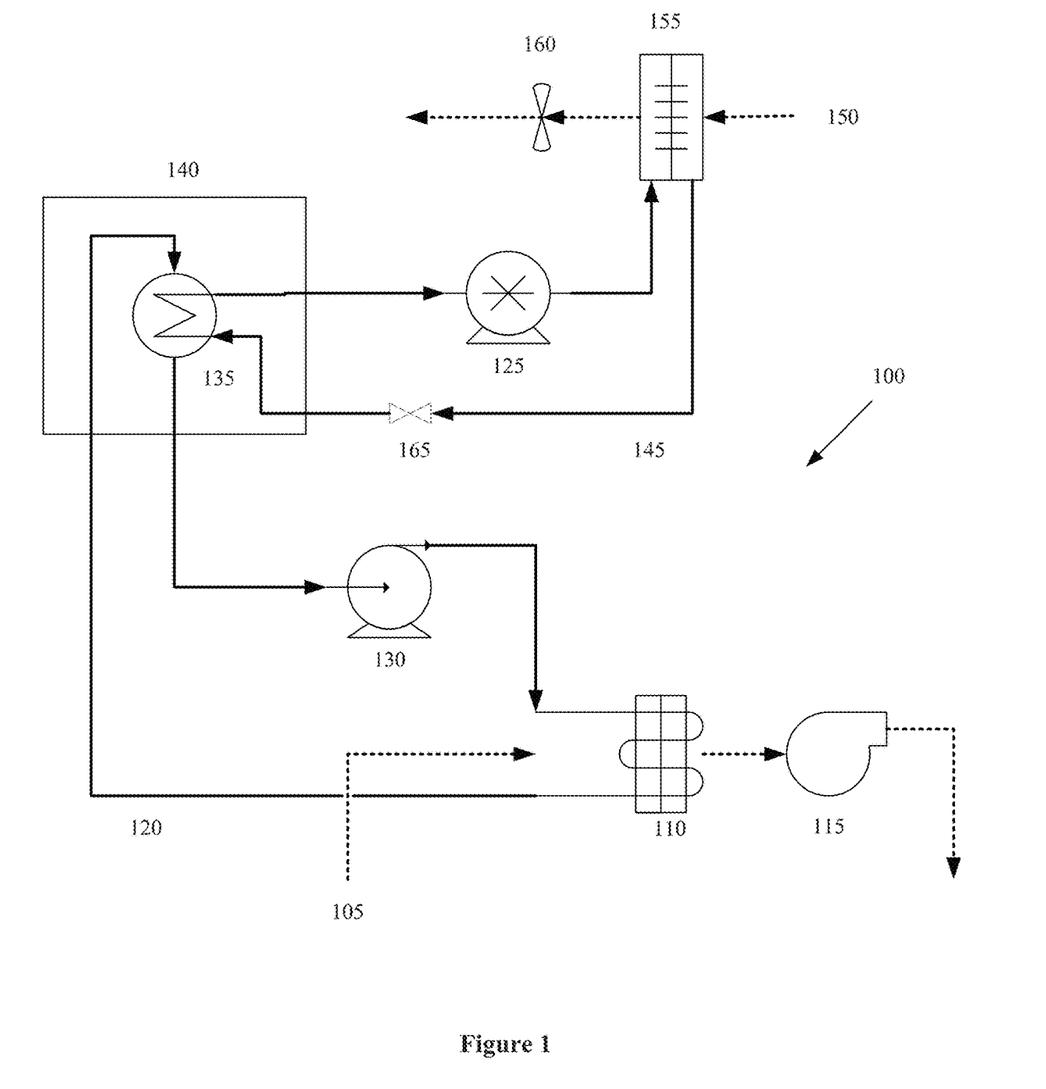
FIG. 1 illustrates an exemplary multi-circuit cooling system.

FIG. 1 illustrates an embodiment of the present disclosure, a multi-circuit cooling system 100 where a first airflow 105 is in contact with a first coil 110, then via a first fan 115 returned to its source. A first fluid 120 is routed through the first coil 110 using a pump 130. The first fluid 120 is directed into a heat exchanger 135 contained in a phase change composite 140. Inside the phase change composite 140, the first fluid 120 exchanges heat with a second fluid 145. The second fluid 145 is directed through a compressor 125 then a condenser 155. In the condenser 155 the second fluid 145 exchanges heat with a second airflow 150. The second airflow 150 is then routed back to its source by a second fan 160. The second fluid is then routed through an expansion valve 165 before returning to the phase change composite 140.

Heat may be removed from the first airflow 105 by the first fluid 120 using the first coil 110. That heat is then either absorbed by the phase change composite 140 or absorbed by the second fluid 145. In some embodiments heat may be absorbed by both the phase change composite 140 and the second fluid 145. If heat is absorbed by the second fluid 145, then second fluid 145 is directed through a compressor 150, which increases the pressure and temperature of the second fluid 145. Second fluid 145 is then routed through an evaporator 155 where heat is absorbed by a second airflow 150. The second airflow 150 is directed, via a fan 160 back to its source. Prior to returning to the phase change composite 140 the second fluid 145 is directed through a valve 165, which decreases the temperature of the second fluid 145.

A first circuit may include the first fluid 120 and the components through which it is directed (i.e., a coil 100 and pump 130). A second circuit may include the second fluid 145 and the components through which is it directed (i.e., a valve 165, evaporator 155, and compressor 150). When the first circuit delivers the same heat rate to the phase change composite as the second circuit removes from the phase change composite, the amount of thermal energy stored in the phase change composite will not change. When the second circuit has a higher heat rate than the first circuit, the thermal energy in the phase change composite will increase and the PCC is said to be "charged." When the first circuit has a higher heat rate than the second circuit, the amount of thermal energy stored in the PCC will decrease and is said to be "discharged."

In some embodiments, the first circuit and second circuit may be operated at the same time. In other embodiments, the second circuit may be stopped (meaning the compressor 150 is turned off and the flow rate is significantly decreased) while the first circuit continues to operate. In some embodiments the first circuit may be stopped (meaning the pump 130 is turned off and the flow rate is significantly decreased) while the second circuit continues to flow. The flow rates and heat rates of the two circuits need not be the same.

In some embodiments, the heat exchange between the refrigerant and secondary fluid through the PCC should be closely thermally coupled, meaning the heat transfer resistance between the two fluids should be minimized. In such an embodiment, the system may be designed with two fluid circuits that are thermally connected through a high conductivity material, such as metal. Thus, heat exchange is not hampered by a lower conductivity PCC because of the large heat transfer between the circuits. Having a PCC with lower conductivity allows for a PCC with higher heat capacity to be used. A larger heat capacity of the PCC results in a larger capacity for thermal energy storage.

Figure 2A:
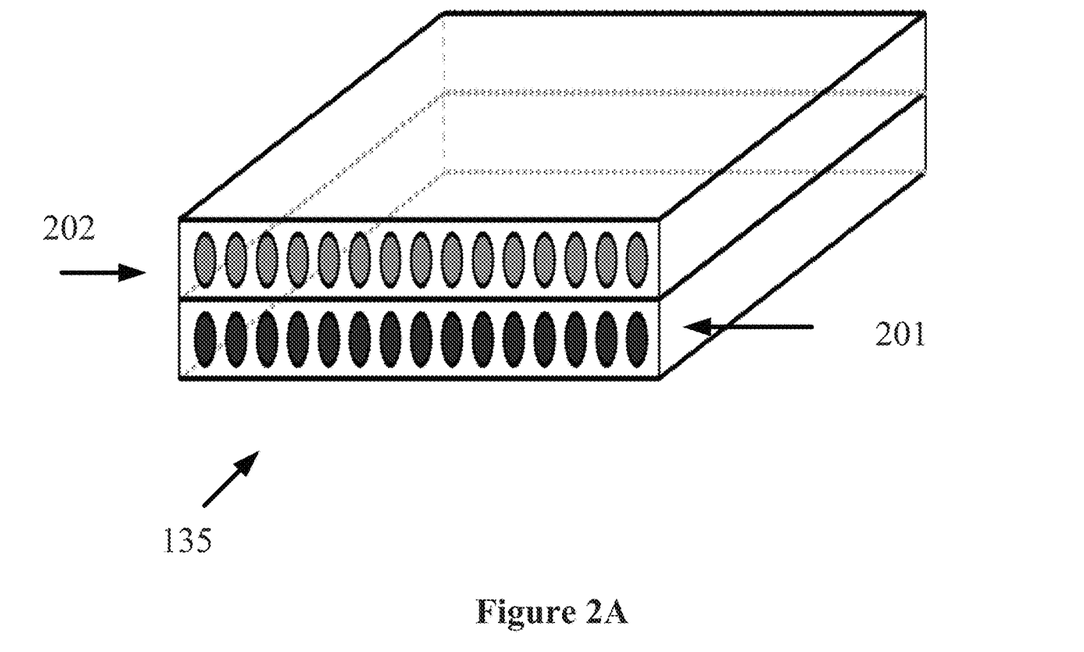
FIGS. 2A and 2B illustrate stacked microchannel heat exchangers.
Figure 2B:
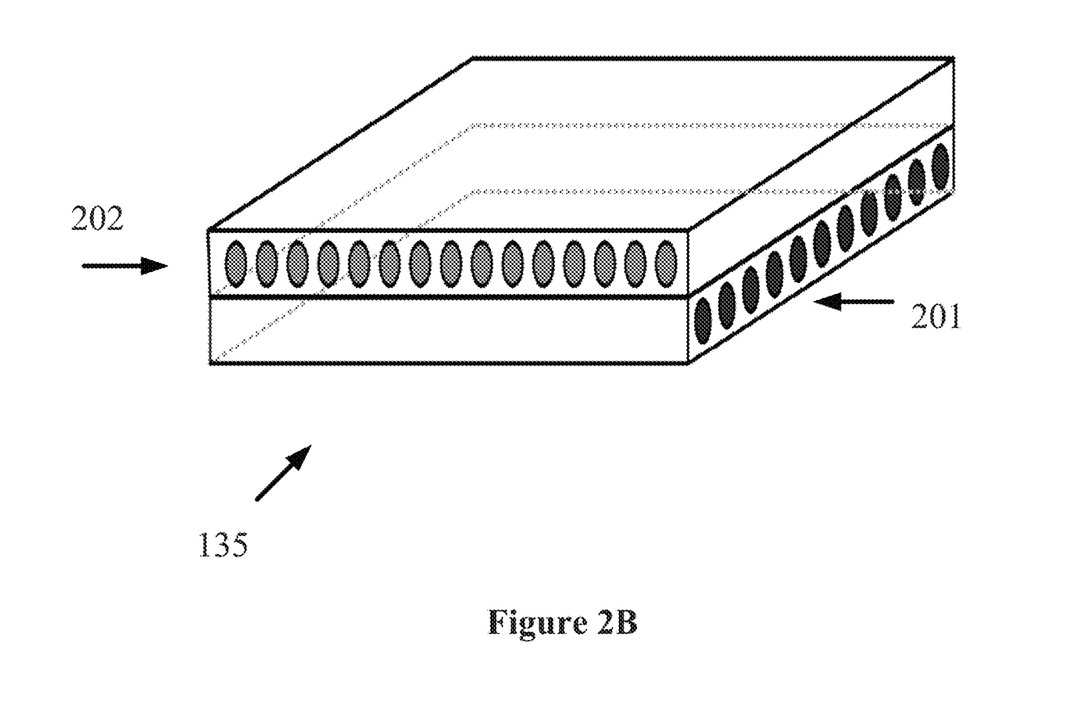

FIGS. 2A, 2B, 3, 4, 5A and 5B show how the two circuits are thermally coupled within the PCC. As shown in FIGS. 2A and B, a heat exchanger 135 is produced by either extruding a micro-channel tube arrangement as shown or by stacking and thermally connecting two single row microchannel tubes. A first plurality of microchannels 201 and a second plurality of microchannels 202 may be arranged in parallel- or counter-flow as shown in FIG. 2A or in cross-flow as shown in FIG. 2B. Only a section of the tubes of the first plurality of microchannels 201 and the second plurality of microchannels 202 are shown in FIGS. 2A and 2B, however, these tubes can be extruded into other lengths. The first plurality of microchannels 201 belong to a first circuit, the second plurality of microchannels 202 belong to a second circuit. The two circuits through the microchannel heat exchanger 135 may be stacked as shown in FIGS. 2A or 2B or in another pattern. The first plurality of microchannels 201 and the second plurality of microchannels 202 may each contain two or more fluids. The first plurality of microchannels 201 may contain the first fluid 120 and the second plurality of microchannels 202 may contain the second fluid 145.

Figure 3:
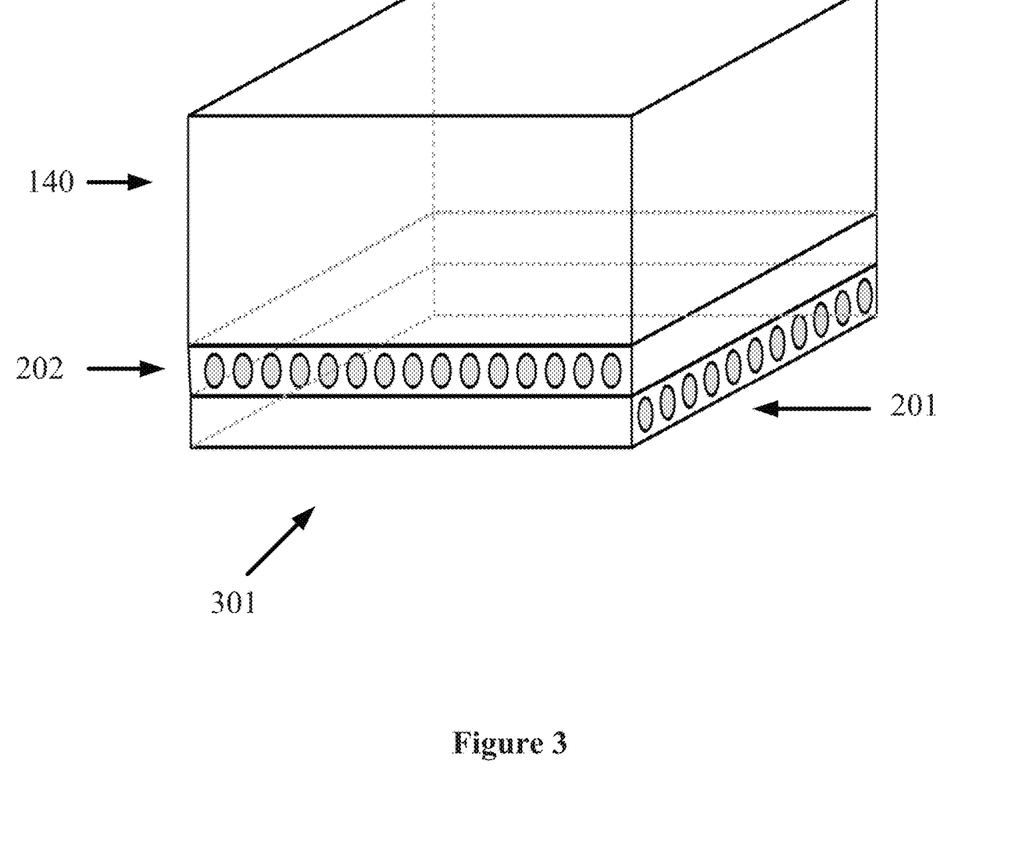
FIG. 3 illustrates a multi-circuit microchannel heat exchanger stacked and thermally connected to a block of phase change composite.

As shown in FIG. 3, the first plurality of microchannels 201 and the second plurality of microchannels 202 may then be thermally connected to a phase change composite (PCC) 140 to form a module 301. In this embodiment, the PCC 140 has a high thermal conductivity normal to the plane of the first plurality of microchannels 201 or second plurality of microchannels 202. This arrangement allows heat to flow from the first plurality of microchannels 201 and the second plurality of microchannels 202 to the PCC 140, or vice versa. Because the first plurality of microchannels 201 and the second plurality of microchannels 202 are closely coupled, the heat transfer resistance from the PCC 140 to the first plurality of microchannels 201 and the second plurality of microchannels 202 is small. Thus, the first plurality of microchannels 201 may have little to no fluid flow and the second plurality of microchannels 202 may have a significant fluid flow, or vice versa. In FIG. 3, the thermal resistance from the first plurality of microchannels 201 to the PCC 140 is small because of the high conductivity of the microchannel material. The first plurality of microchannels 201 and the second plurality of microchannels 202 themselves may also be made of a high conductivity material.

Figure 4:
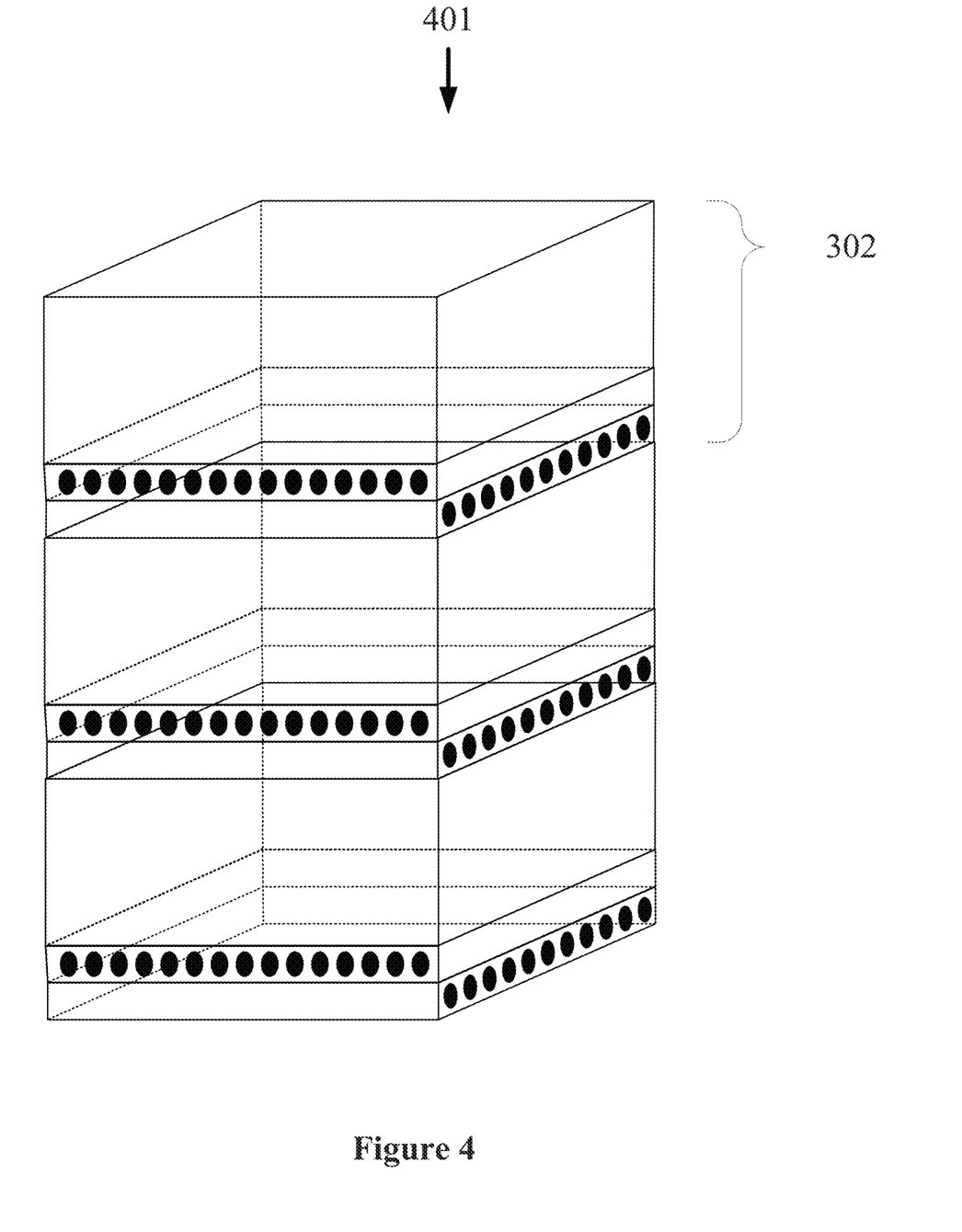
FIG. 4 illustrates an assembly of a series of thermal energy storage modules wherein the circuits are in a cross-flow arrangement.

As shown in FIG. 4, stacked modules 301 may be repeated to become a thermal energy storage (TES) unit 401. Each module 301 comprises the first plurality of microchannels 201 and the second plurality of microchannels 202 and PCC 140, as shown in FIG. 3. Stacking the modules may result in the PCC 140 being in thermal communication channels 201 and 202 in the adjacent module 301.

Figure 5A:
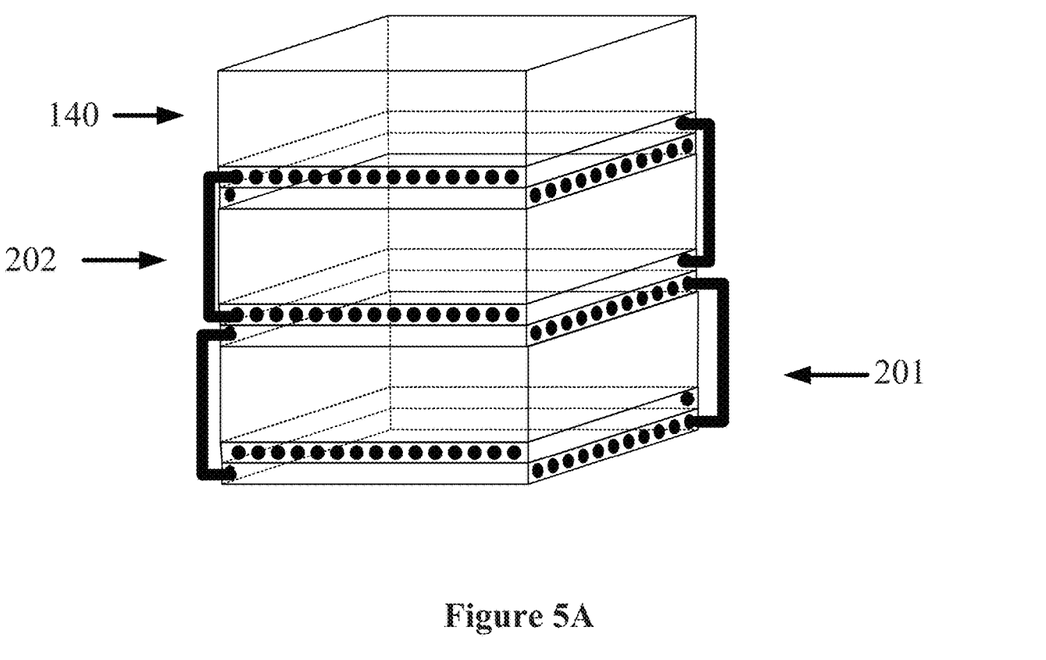
FIGS. 5A and 5B illustrate thermal energy storage modules with two fluid circuits.
Figure 5B:
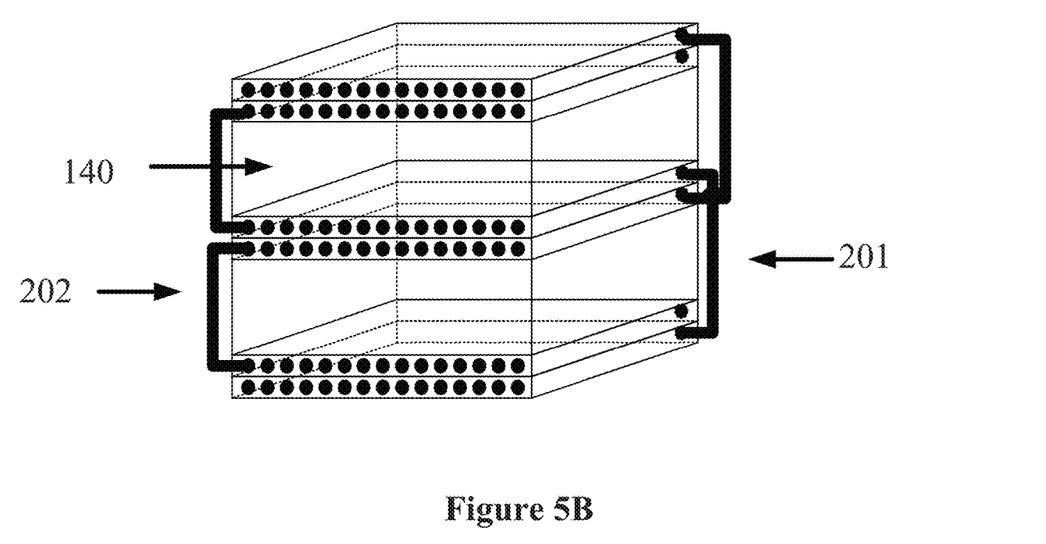

Because the first plurality of microchannels 201 and the second plurality of microchannels 202 may be bent, they may wrap around the PCC 140 layers of the TES unit 401, as shown in FIGS. 5A and 5B. FIG. 5A shows the first plurality of microchannels 201 and the second plurality of microchannels 202 arranged in a cross-flow configuration and wrapping around the PCC 140. FIG. 5B shows the first plurality of microchannels 201 and the second plurality of microchannels 202 arranged in a parallel- or counter-flow configuration and wrapping around the PCC 140. Additional channels may be added to make a larger multi-circuit TES unit 401. In some embodiments, the first plurality of microchannels 201 and the second plurality of microchannels 202 need not be closely coupled as long as each channel has PCC 140 on both sides.

It may be beneficial to reuse thermal energy storage during periods when a building requires heating. Through a series of valves, pipes, and controls the system may use the compressor to provide three modes of operation. The first is a discharging mode, wherein heat is drawn from the PCC and delivered to a heating coil to heat the building. This occurs when the heat being removed from the PCC is greater than the heat being added to the PCC. Thus, the heat rate of the secondary fluid is greater than the heat rate of the refrigerant. During this discharging mode the PCC may undergo a phase change and may solidify. The second mode is a heating only mode without the use of the PCC, and thus without the use of TES. In this second mode heat is drawn from the outdoor coil and delivered to the heating coil. Thus, the heat rate of the secondary fluid is equal to the heat rate of the refrigerant. The third mode is a charging mode of the PCC material. During this third mode heat is drawn from the outdoor coil and delivered to the PCC material. During this third mode the PCC material may undergo a phase change and may liquify or melt.

The charging and discharging modes may be independent and may occur at different times or simultaneously. This decouples the energy use of the refrigeration system from the cooling or heating load of the building, enabling improved flexibility and efficiency. The flexibility comes from the decoupling of energy use with the delivered service, which allows the system to be responsive to the grid without compromising thermal comfort. System efficiency gains may be the result of operating the refrigeration system during cooler ambient conditions or operating the system with less cycling.

Operating using these three modes is beneficial because extracting heat from the TES when the ambient temperature is much colder than the TES's phase transition temperature is much more efficient than traditional air conditioning processes. This arrangement also enables the compressor to pump the necessary heat from the ambient in two steps: first from the ambient to the TES, then from the TES to the process air. This allows the lift to be broken into two steps, which may be performed by two compressors, reducing the lift on each individual compressor and keeping the lift within the optimum range of most compressors. Additionally, the liquid refrigerant will be colder exiting the PCC material (during the charging mode, while melting the PCC material) which feeds colder refrigerant to the outdoor coil. This allows for a higher extraction of heat from the ambient without additional refrigerant flow from the compressor. More thermal energy may be extracted without additional electronic power to the compressor. This enables the use of a lower capacity compressor for heating, which helps in balancing the compressors capacity during cooling and heating months. Because the compressor requires the most electrical energy to operate, reducing its power requirements can reduce the electrical energy needs of the system. A variable-speed fan may enable capacity control without the need for a variable-speed compressor because heat can be transferred to the PCC material at a variable rate.

Additionally, the refrigeration system may interact with the PCC material and not the building. A secondary fluid may be cooled in a first plurality of microchannels in the PCC material by adding heat to the PCC material and then removing heat from the supplied airstream. The refrigerant may absorb heat from the PCC via a second plurality of microchannels in the PCC and release heat to the ambient. This enables the use of non-traditional refrigerants, such as propane, which are generally avoided because of concerns about air quality.

Properly sizing the TES module (and therefore the PCC material) is important for the TES system to function properly and remain cost competitive. An objective of the TES as it relates to size is to not require the compressor to operate for longer than fifteen (15) minutes. If the compressor operates for longer than fifteen minutes, then it will contribute to the building's overall whole energy demand. A goal of the TES system is to reduce the electrical energy required for heating and cooling a building.

In some embodiments, during peak cooling hours (i.e., during the day) the compressor may operate continuously for ten (10) minutes, then the TES system will operate in a discharging mode (wherein heat is removed from the process air and heat is added to the PCC material) continuously for five (5) minutes. This operation of the compressor then operation of the TES system in the discharging mode may be repeated during peak air conditioning hours. During non-peak hours (i.e., in the evening and night) the compressor may cool the air and the TES system may be operated in the charging mode (wherein heat is removed from the PCC material and released to the outside air).

In some embodiments, a staged compressor or set of tandem compressors may be used at part load during the peak air conditioning hours. A variable speed compressor may also be used at reduced speed. Using these configurations of compressors may reduce the electrical needs of the system and prevent the system from significantly contributing to the electrical load of the building.

The measure of the charge of the PCC may be stated as the state-of-charge (SOC). The SOC indicates how much thermal energy the PCC contains or can absorb. The relationship between the state of charge for a heating application and a cooling application is shown in Equation 1 below.

$$SOC_{heating} = 100\% - SOC_{cooling} \quad \text{(Equation 1)}$$

Where $SOC_{heating}$ is the state of charge for when the building requires heating and $SOC_{cooling}$ is the state of charge when the building requires cooling. The two SOCs sum to 100% because as the building is heated, the PCC gains the ability to absorb heat from the building should cooling be necessary. And as the building is cooled, the PCC gains the ability to release heat to the building should heating be necessary. As used herein, "charging" refers to adding thermal energy to the PCC, and therefore SOC is the $SOC_{heating}$, unless otherwise indicated.

To effectively use the TES system to reduce energy consumption and thus costs, controlling the SOC of the PCC material may be important. During high volume days (such as week days in non-residential buildings), the SOC of the PCC material may be near zero (meaning it can hold no more heat) by the end of the day (approximately 6:00 PM). On lower volume days (such as weekend days in non-residential buildings), the SOC of the PCC material may be used for cycles of more than ten minutes, so the PCC material may have a SOC of zero by the end of the day.

In some embodiments, the SOC may be controlled by comparing the current SOC to the target SOC and discharging the TES system to result in the TES system being fully discharged by the end of the day. This may allow a greater TES system discharge (and therefore less compressor runtime) per timestep. This system may be used only for low volume days, as during high volume days the TES system may be operated for ten minutes then the compressor may be run for five minutes. On low volume days the control scheme may ensure that the TES system is used to its fullest capacity and saving as much compressor energy as possible during the day (approximately 12:00 PM to 6:00 PM).

Figure 6:
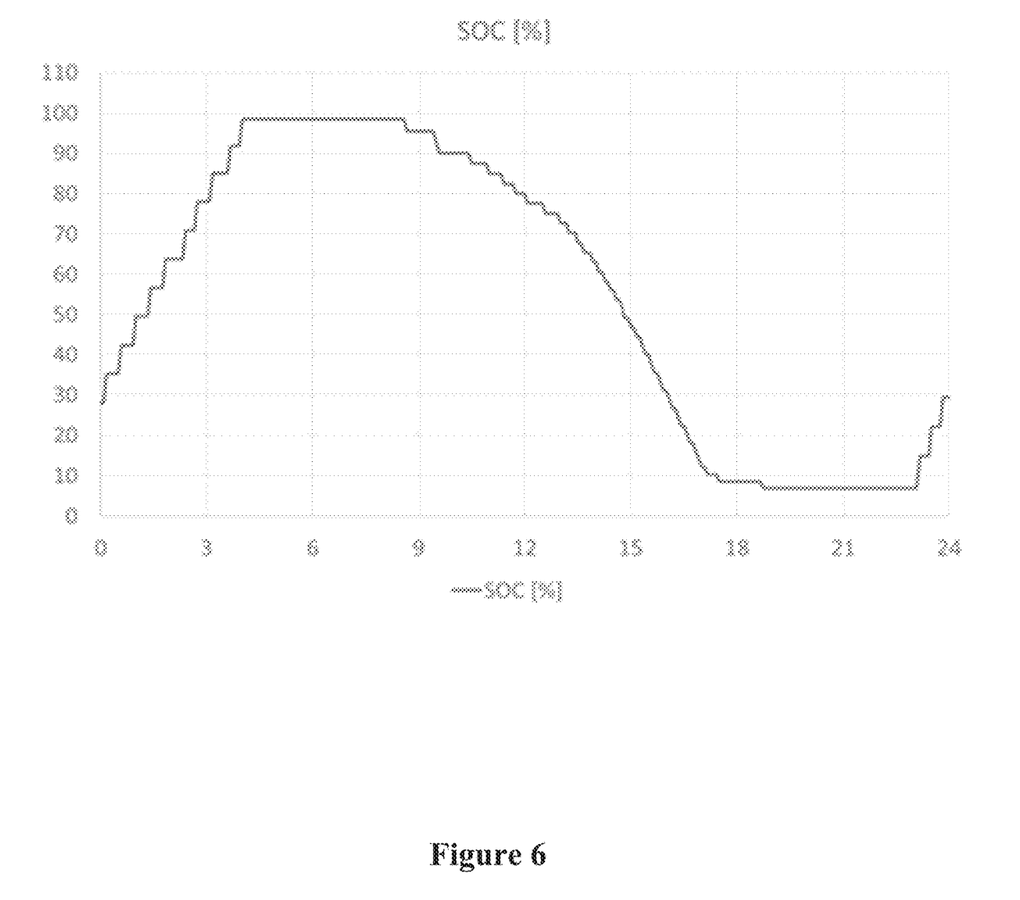
FIG. 6 illustrates the state of charge (SOC) of a thermal energy storage media as a function of time throughout the day.

FIG. 6 illustrates a state of charge (SOC) graph for a PCC in a cooling application. At 100% $SOC_{cooling}$, the bulk average temperature of the PCC is approximately –2° C. At 0% $SOC_{cooling}$, the bulk average temperature of the PCC is approximately 15° C. The phase change temperature used in this example is approximately 6.5° C. Therefore, the $SOC_{cooling}$ includes both the latent heat of fusion (i.e., the energy released during the phase transition at 6° C.) and the sensible heat to cool from approximately 15° C. to approximately –2° C. The latent heat of fusion may be approximately 85% of the total heat content of the PCC.

Examples

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations may be combined in alternate aspects, embodiments, or configurations other than those discussed above. This method of disclosure is not to be interpreted as reflecting an invention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

Example 1

Figure 7:
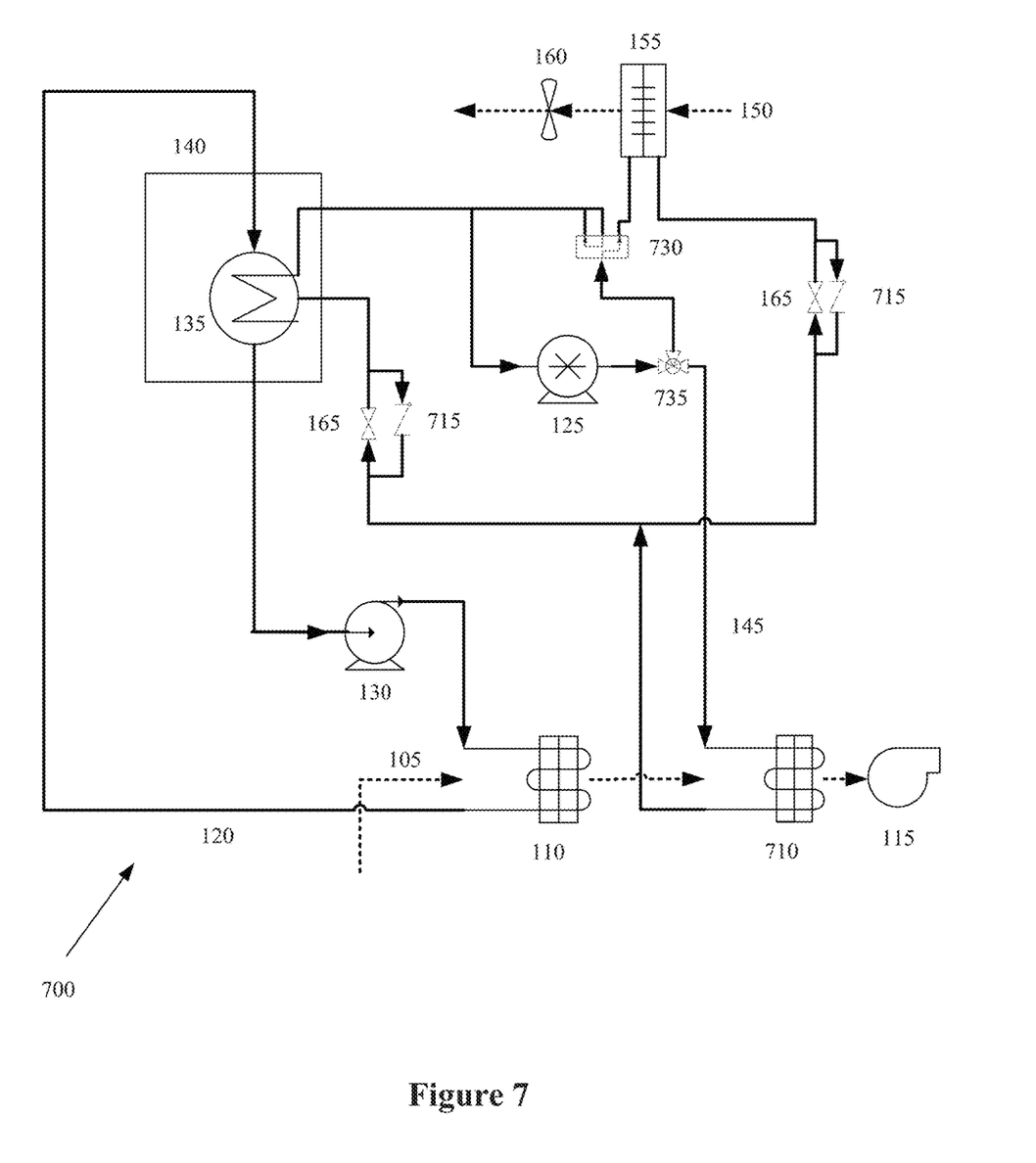
FIG. 7 illustrates an exemplary multi-circuit heating and cooling system.

FIG. 7 illustrates one possible embodiment of a multi-circuit heating and cooling system 700, wherein a first fluid 120 and a second fluid 145 are routed through a phase change composite 140 to form a heat exchanger 135. In this embodiment, the second fluid 145 may be routed through a second coil 710 to exchange heat with the first airflow 105. The second fluid 145 may be directed to the heat exchanger 135 inside PCC 140 by way of an expansion valve 165 and check valve 715. After exchanging heat with the PCC 140 in the heat exchanger 135, the second fluid 145 may be directed through a reversing valve 730. The reversing valve 730 may change the direction of flow of the second fluid 145. In this embodiment the second fluid 145 may add or remove heat from the phase change composite 140.

In this embodiment, the second fluid 145 removes heat from the first airflow 105 by use of a first coil 110 and deposits heat in the PCC 140 (i.e., the PCC 140 is discharged). Heat is removed from the PCC 140 (i.e., the PCC 140 is charged) by a second fluid 145. In some embodiments the second fluid 145 may be refrigerant. The second fluid 145 may be routed through a reversing valve 730, compressor 125, and a three-way valve 735 on its way to a second coil 710. When the second fluid 145 flows through the second coil 710 it may heat the first airflow 105. After leaving the second coil 710 the second fluid 145 is either returned to the PCC 140 by way of an expansion valve 165 or routed through a condenser 155.

By operating the embodiment described in FIG. 7 in three different modes of operation, the process may be made more efficient. During the first operation, heat is removed from the PCC 140 by the second fluid 145 and delivered to a second coil 610. In this operation the PCC 140 is "discharged" as the amount of thermal energy in the PCC 140 is decreased. During the second operation, heat is added to the PCC 140 by the first fluid 120, which removed heat from the first airflow 105. In this operation the PCC 140 is "charged" as the amount of thermal energy in the PCC 140 is increased. During the third operation, heat is added to the second fluid 145 by the first fluid 120. In this operation the thermal energy storage in the PCC remains unchanged.

In this embodiment, the first airflow 105 may be simultaneously heated (by the second fluid 145 in the second coil 610) and cooled (by the first fluid 120 in the first coil 110). The first airflow 105 may also be independently heated or cooled by the multi-circuit heating and cooling system 700. The direction of flow of the first fluid 120 and the second fluid 145 may be switched as needed based on whether the multi-circuit heating and cooling system 700 is heating the first airflow 105 or cooling the second airflow 105.

Example II

Figure 8:
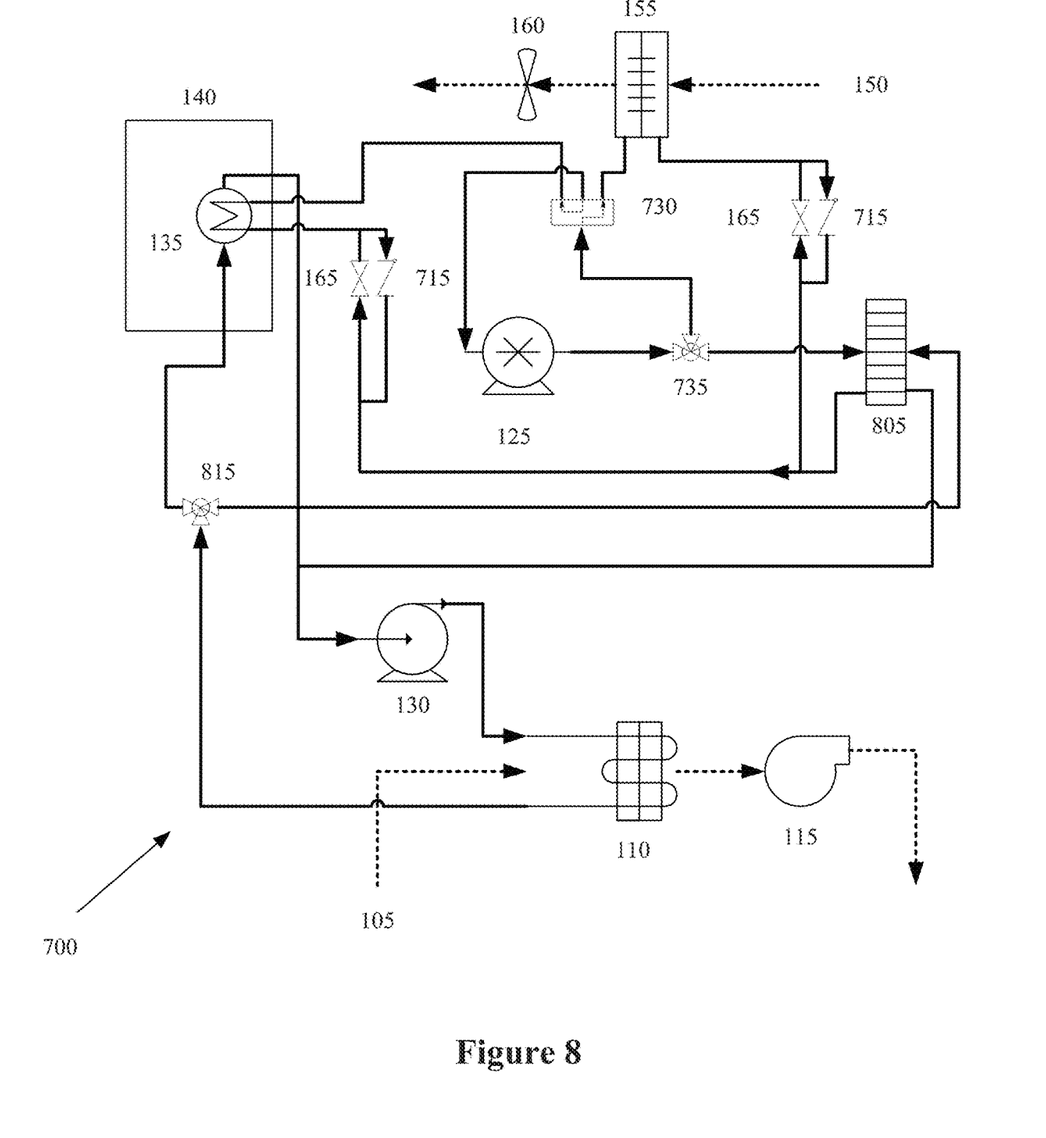
FIG. 8 illustrates an exemplary multi-circuit cooling system.

FIG. 8 illustrates one embodiment of the present disclosure, a multi-circuit heating and cooling system 700. In this embodiment, the first fluid 120 may exchange heat with the second fluid 145 both in the heat exchanger 135 inside the PCC 140 and in a fluid heat exchanger 805. In this embodiment, the second fluid 145 does not add heat to the first airflow 105 via the second coil 710 (as in FIG. 7), but instead exchanges heat with the first fluid 120 in fluid heat exchanger 805. In this embodiment, the first fluid 120 may be used to heat and cool the first airflow 105, rather than using the first fluid 120 for cooling the first airflow 105 and the second fluid 145 to heat the first airflow 105 (as shown in FIG. 7). A distinction from the embodiment shown in FIG. 7 is that in the embodiment shown in FIG. 8, simultaneous cool and reheat of the first airflow 105 is not possible.

In this embodiment, the second fluid 145 may be a refrigerant. Additionally, because the second fluid 145 is exchanging heat with the first fluid 120 and not the first airflow 105, the second fluid 145 may be more highly flammable than traditional refrigerants. For example, the second fluid 145 may be propane.

Example III

Figure 9:
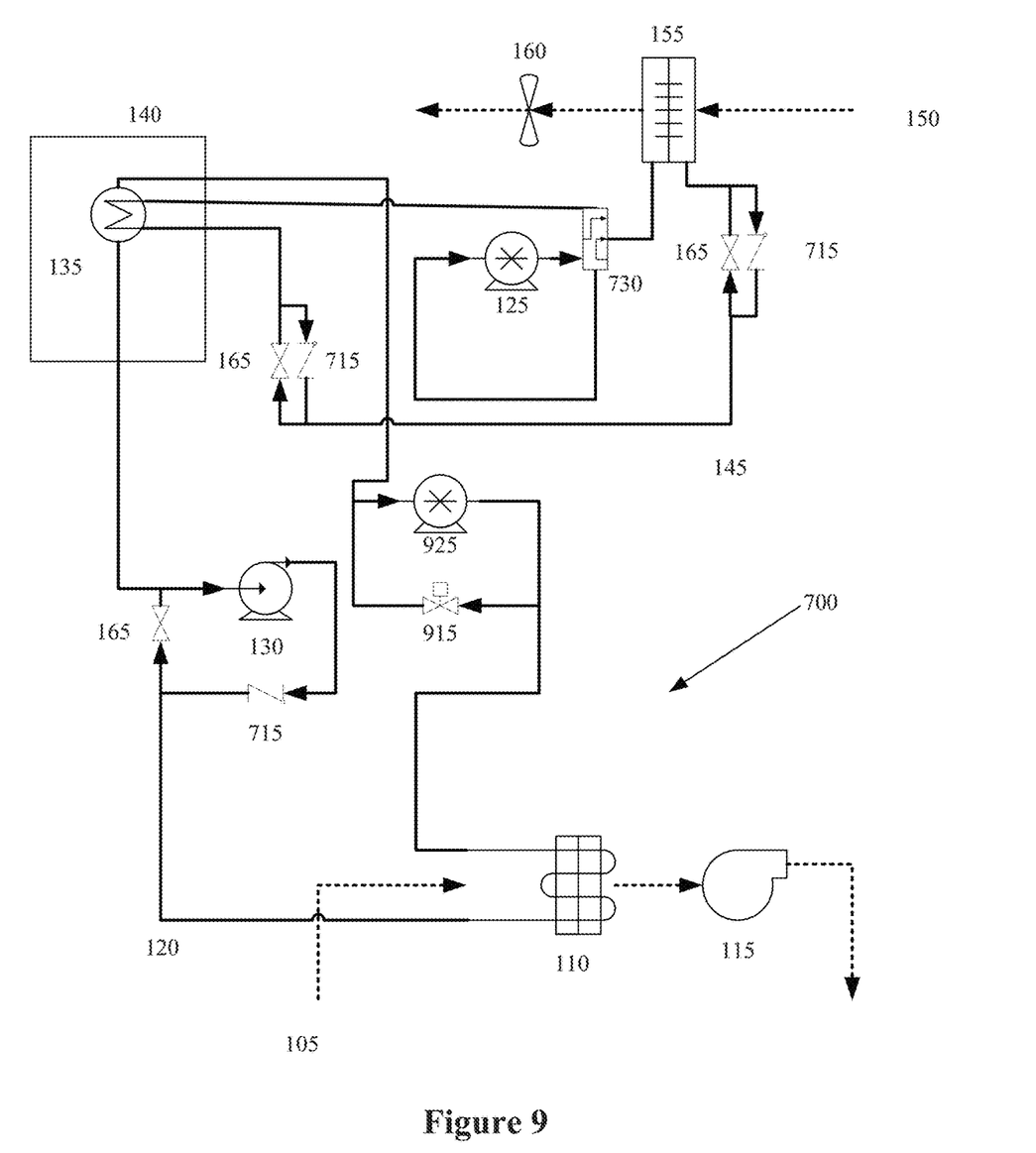
FIG. 9 illustrates an exemplary multi-circuit heating and cooling system.

FIG. 9 illustrates one embodiment of the present disclosure, a multi-circuit heating and cooling system 700. In this embodiment, the PCC 140 is integrated with a heat pump 925 that provides both heating and cooling to a first airflow 105. The flow of the first fluid 120 to the heat pump 925 may be controlled by an on/off valve 915. The first fluid 120 and second fluid 145 may operate independently such that the first fluid 120 may operate at a drastically different fluid flow rates from the second fluid 145. Likewise, one circuit may be shut down while the other one operates. This is advantageous, because heat may be added to the PCC 140 during the warmest part of the day, then heat may be pumped to the first airflow 105 later. This may save energy by reducing the lift of compressor 125. This operation may also help in scheduling electric load on the grid. Compressor 125 may operate when electricity is abundant or cheap, and shut down when electricity is scarce. Compressor 925 may operate to meet the first airflow 105's heating load as required. Operating in this manner, nearly half of the power for heating a first airflow 105 may be shifted to periods with cheap electricity.

In this embodiment, the PCC 140 may be used as an intermediary heat exchanger between the first fluid 120 and the second fluid 145. This enables simultaneous heat addition and subtraction to the PCC 140 when operating the system to heat the first airflow 105. In this embodiment the first airflow 105 may be simultaneously heated and cooled by the multi-circuit heating and cooling system 700. The pump 130 may be used to heat the PCC 140 when operating the system to cool the first airflow 105.

Figure 10:
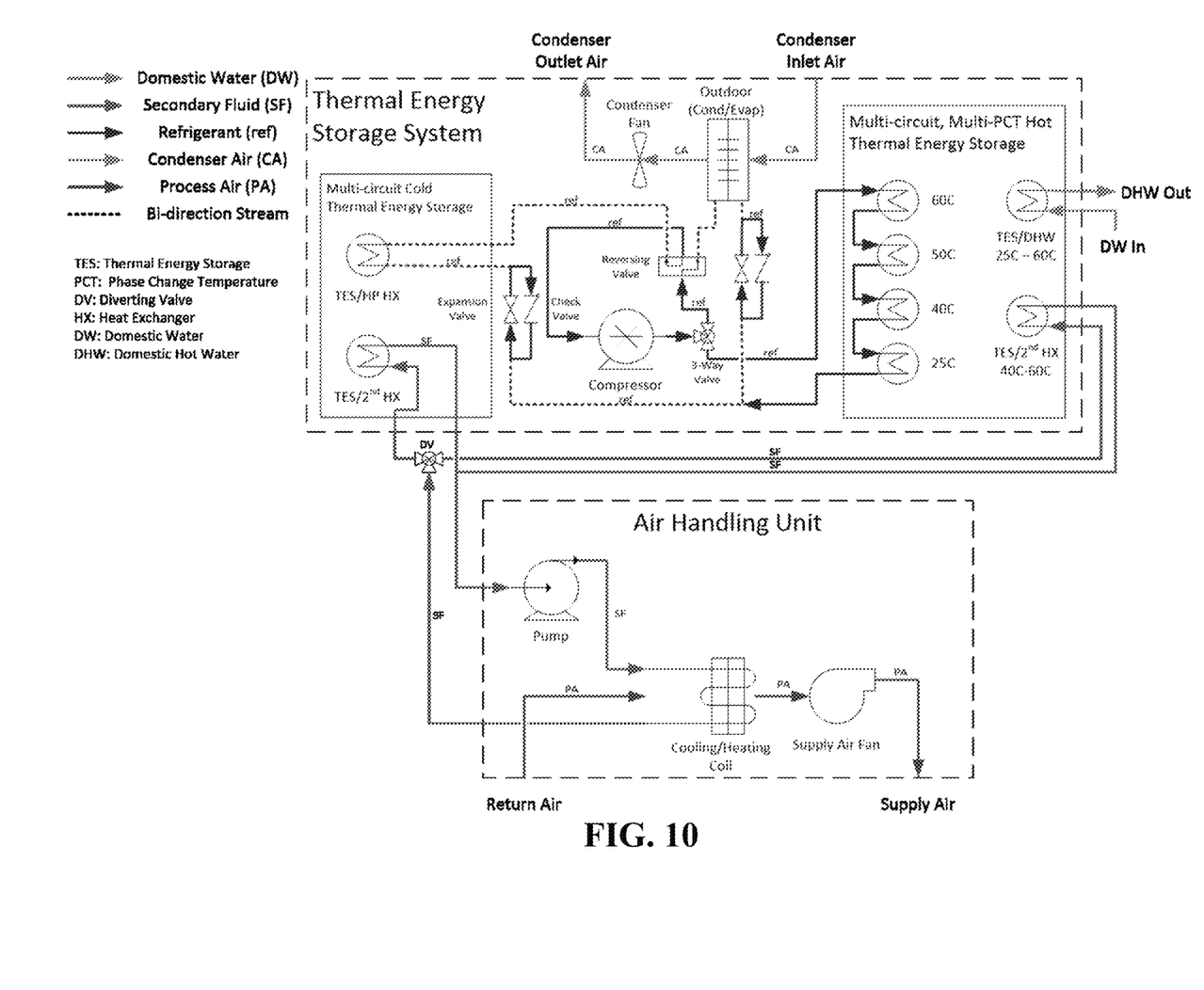
FIG. 10 illustrates an exemplary multi-circuit cooling system with added hot thermal energy storage.

FIG. 10 shows a system that builds upon a cooling system comprising a multi-circuited phase-change composite heat exchanger by adding hot thermal energy storage to the cold storage.

What is claimed is:

1. A system configured to heat an indoor airflow of a building, the system comprising:
   a first fluid configured to be in thermal communication with the indoor airflow;
   a second fluid configured to be in thermal communication with an external airflow; and
   a phase change composite in thermal communication with the first fluid and in thermal communication with the second fluid; wherein:
   the first fluid is configured to transfer heat from the phase change composite to the indoor airflow,
   the second fluid is configured to transfer heat from the external airflow to the phase change composite, and
   the phase change composite is configured to transfer heat to the first fluid when the phase change composite undergoes a phase change.

2. The system of claim 1, further comprising: an evaporator; wherein:
   the second fluid is configured to flow through the evaporator, and
   the evaporator is in thermal contact with the external airflow.

3. The system of claim 1, further comprising:
   a heating coil; wherein:
   the first fluid is configured to flow through the heating coil, and
   the heating coil is in thermal contact with the indoor airflow.

4. The system of claim 1, wherein:
   the phase change composite comprises a phase change material embedded in a plurality of pores of a thermal conductivity matrix.

5. The system of claim 4, wherein:
   the thermal conductivity matrix comprises graphite.

6. The system of claim 4, wherein:
   the phase change material comprises an organic alkane, an inorganic alkane, or a fatty acid.

7. The system of claim 1, wherein:
   the first fluid comprises water, brine, propylene, ethylene glycol, R410A, or carbon dioxide.

8. The system of claim 1, wherein:
   the second fluid comprises water, brine, propylene, ethylene glycol, R410A, or carbon dioxide.

9. The device of claim 1, wherein:
   the phase change comprises the phase change composite solidifying.

10. A method for heating an indoor airflow of a building, the method comprising:
    directing a first fluid through a phase change composite such that the first fluid and the phase change composite are in thermal communication;
    directing a second fluid through the phase change composite such that the second fluid and the phase change composite are in thermal communication;
    absorbing heat from an external airflow to the second fluid;
    transferring heat from the second fluid to the phase change composite and from the phase change composite to the first fluid; and
    thermally contacting the indoor airflow with the first fluid; wherein:
    the phase change composite is in thermal communication with the first fluid and the second fluid,
    the transferring comprises the phase change composite undergoing a phase change.

11. The method of claim 10, wherein: the absorbing is performed using an evaporator.

12. The method of claim 10, wherein:
    the phase change composite comprises a phase change material embedded in a plurality of pores of a thermal conductivity matrix.

13. The method of claim 12, wherein:
    the phase change material comprises an organic alkane, an inorganic alkane, or a fatty acid.

14. The method of claim 12, wherein:
    the thermal conductivity matrix comprises graphite.

15. The method of claim 10, wherein:
    the first fluid comprises water, brine, propylene, ethylene glycol, R410A, or carbon dioxide.

16. The method of claim 10, wherein:
    the second fluid comprises water, brine, propylene, ethylene glycol, R410A, or carbon dioxide.

17. The method of claim 10, wherein:
    the contacting is performed using a heating coil, and
    the first fluid is configured to flow through the heating coil.

18. The method of claim 10, wherein:
    the directing the first fluid through the phase change composite is performed using a first plurality of tubes, and
    the directing the second fluid through the phase change composite is performed using a second plurality of tubes.

19. The method of claim 10, wherein:
    the transferring comprises heat moving from the second fluid and the phase change composite to the first fluid.

20. The method of claim 10, wherein:
the undergoing a phase change comprises the phase change composite solidifying.

* * * * *